United States Patent
Pasolini et al.

(10) Patent No.: US 7,979,235 B2
(45) Date of Patent: Jul. 12, 2011

(54) METHOD AND DEVICE FOR DETECTING ANOMALOUS EVENTS FOR AN ELECTRONIC APPARATUS, IN PARTICULAR A PORTABLE APPARATUS

(75) Inventors: Fabio Pasolini, S. Martino Siccomario (IT); Alberto Ressia, Viguzzolo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 87 days.

(21) Appl. No.: 12/357,620

(22) Filed: Jan. 22, 2009

(65) Prior Publication Data
US 2009/0187370 A1 Jul. 23, 2009

(30) Foreign Application Priority Data

Jan. 22, 2008 (EP) .................. 08425029

(51) Int. Cl.
*G01P 15/00* (2006.01)
*G11B 21/02* (2006.01)
(52) U.S. Cl. ................ 702/141; 360/75
(58) Field of Classification Search .......... 702/141
See application file for complete search history.

(56) References Cited

U.S. PATENT DOCUMENTS

| | | | | |
|---|---|---|---|---|
| 5,982,573 A * | 11/1999 | Henze | ............... | 360/75 |
| 7,813,074 B2 * | 10/2010 | Shimotono et al. | .............. | 360/75 |
| 7,813,892 B2 * | 10/2010 | Sugawara et al. | ............. | 702/160 |
| 2002/0087235 A1 * | 7/2002 | Aga et al. | ........................ | 701/1 |
| 2004/0169636 A1 * | 9/2004 | Park et al. | .................... | 345/156 |
| 2005/0141127 A1 | 6/2005 | Shimotono et al. | | |
| 2006/0136168 A1 | 6/2006 | Nakamura et al. | | |
| 2006/0268447 A1 | 11/2006 | Liao et al. | | |
| 2007/0118326 A1 | 5/2007 | Starodubtsev et al. | | |
| 2007/0177295 A1 | 8/2007 | Miyoshi et al. | | |
| 2008/0288200 A1 * | 11/2008 | Noble | ............. | 702/96 |
| 2009/0021858 A1 * | 1/2009 | Fu et al. | .................... | 360/99.01 |

OTHER PUBLICATIONS

Grieco et al., "A Low-g 3 Axis Accelerometer for Emerging Automotive Applications", article, AMAA 2004 proceedings book, p. 211.

* cited by examiner

*Primary Examiner* — Jonathan C Teixeira Moffat
(74) *Attorney, Agent, or Firm* — Seed IP Law Group PLLC (57) ABSTRACT

Detection of an anomalous event in an electronic apparatus includes detecting accelerations acting on the electronic apparatus, establishing a normal-mode range of accelerations that corresponds to normal operation of the apparatus, and detecting the anomalous event when a level of acceleration of the electronic apparatus exits the normal-mode range and remains outside the normal mode range for more than a defined duration. The method includes displacing the normal-mode range toward a current level of acceleration of the electronic apparatus while the level of acceleration remains outside the normal-mode range. Additionally, the normal-mode range is increased toward a maximum size while the level of acceleration remains outside the normal-mode range, and is decreased toward a minimum size while the level of acceleration is within the normal-mode range.

26 Claims, 9 Drawing Sheets

METHOD AND DEVICE FOR DETECTING ANOMALOUS EVENTS FOR AN ELECTRONIC APPARATUS, IN PARTICULAR A PORTABLE APPARATUS

BACKGROUND

1. Technical Field

The present disclosure relates to a method and device for detecting anomalous events for an electronic apparatus, in particular a portable apparatus, for example for detecting free-fall events, to which the ensuing treatment will make particular reference, without this implying any loss of generality.

2. Description of the Related Art

As is known, portable electronic apparatuses can easily be subjected during their normal use to potentially harmful or even destructive events, such as free-fall events, impact, high vibrations, or shock in general. These events are herein defined as "anomalous events", in so far as they are extraneous to a condition of normal use or operation of portable apparatuses (a so-called "normal mode" condition). In particular, the normal-mode condition is defined by the set of actions (for example, actuation of keys or pushbuttons, displacements, rotations, etc.) and by the external conditions (for example, environmental conditions) normally associated with the use of the portable apparatus.

Anomalous events are particularly harmful in the case where the portable apparatuses are provided with a hard-disk unit. In fact, in a hard disk, a read/write head is generally kept at a minimum distance of separation from a storage medium (a magnetic film carried by a rotating disk). In the case of a fall or other shock, the read/write head can collide with the storage medium and thus cause damage to the hard disk and/or irreversible loss of stored data.

In order to prevent, or at least limit, occurrence of destructive events, it has been proposed to use detection devices within the portable apparatuses, designed to detect occurrence of a particular anomalous event (for example, a fall or a shock) and to implement suitable actions of protection. For example, once the anomalous event has been detected, it is possible to issue a command for forced "parking" of the read/write head of a hard disk of the portable apparatus, which is brought into a safe area (for example, the position assumed by the head with the apparatus turned off).

Detection devices generally operate on the basis of detection of accelerations acting on the portable apparatuses, and are provided, for this purpose, with accelerometric sensors, in particular microelectromechanical (MEMS) inertial sensors made using the semiconductor technologies, which prove advantageous given their small size.

As is known, an inertial sensor of a microelectromechanical type in general comprises a mobile mass, suspended above a substrate, and anchored to the substrate and to a corresponding package via elastic elements. Mobile electrodes are fixedly coupled to the mobile mass, and fixed electrodes, capacitively coupled to the mobile electrodes, are fixedly coupled to the substrate. In the presence of an acceleration, the mobile mass undergoes a displacement with respect to the substrate, which brings about a capacitive variation of the capacitor formed between the mobile electrodes and the fixed electrodes. Starting from the capacitive variation, via appropriate processing operations, it is possible to determine the value of the acceleration acting on the sensor. In particular, also in conditions of rest, the inertial sensor detects a non-zero acceleration, due to the effect of the Earth's gravitational acceleration (g), which determines in any case a displacement of the mobile mass with respect to a position of equilibrium.

Detection of anomalous events by the protection devices is generally based on the result of the comparison between an instantaneous absolute value of acceleration, measured by the corresponding inertial sensors, and one or more acceleration thresholds.

For example, in the case of the free-fall event, the portable apparatus, and the inertial sensor fixed thereto, are to a first approximation subject only to the Earth's gravitational acceleration (g). In this condition, both the mobile mass and the package of the inertial sensor are subjected to the same acceleration (g) so that the displacement of the mobile mass with respect to a reference system fixed with respect to the package, also in free-fall conditions, is zero, as also is the acceleration detected. Consequently, a free-fall condition is detected when the resultant acceleration detected is lower than a pre-set threshold, or, alternatively, when the values of the individual components of acceleration detected along a first axis, a second axis, and a third axis of a set of three Cartesian axes fixed with respect to the inertial sensor drop simultaneously below the pre-set threshold. In its simplest embodiment, the algorithm for free-fall detection hence requires only definition of a threshold value and comparison of the instantaneous values of acceleration with this threshold. Usually, a control is added on the time length of the free-fall event detection so as to reject false detections that have a duration shorter than a given time interval (for example, 90 ms).

A shock acting on the portable apparatus is detected in a substantially similar way by verifying that a given threshold has been exceeded by the instantaneous acceleration acting on the portable apparatus.

BRIEF SUMMARY

According to an embodiment of the present invention, a method for detecting anomalous events in an electronic apparatus is provided, that includes detecting accelerations acting on the electronic apparatus, establishing a normal-mode range of accelerations that corresponds to normal operation of the apparatus, and detecting the anomalous event when a level of acceleration of the electronic apparatus exits and remains outside the normal-mode range for more than a defined duration. The method includes displacing the normal-mode range toward a current level of acceleration of the electronic apparatus while the level of acceleration remains outside the normal-mode range. Additionally, the normal-mode range is increased toward a maximum size while the level of acceleration is outside the normal-mode range, and is decreased toward a minimum size while the level of acceleration is within the normal-mode range.

According to an embodiment, if the acceleration exits the normal-mode range for a first duration, returns to a normal-mode condition for a second duration, then exits the normal-mode condition again, for a third duration, and if the second duration, in the normal-mode condition, is less than a duration threshold, the first and third durations are combined for the purpose of detecting an anomalous event.

According to another embodiment, a device for detecting anomalous events is provided.

BRIEF DESCRIPTION OF THE SEVERAL VIEWS OF THE DRAWINGS

For a better understanding of the present disclosure, preferred embodiments are now described, purely by way of non-limiting example and with reference to the attached drawings, wherein.

DETAILED DESCRIPTION

Known methods for detection of anomalous events have a series of problems that may jeopardize their reliability. In particular, two factors of disturbance can alter the identification of an anomalous event: a significant offset of the inertial sensor, i.e., a case in which the sensor indicates some acceleration value while at rest; and, at least in the case of identification of free fall, the rotation of the portable apparatus during the fall (the "roll" effect).

The first factor of disturbance is intrinsic to the inertial sensor and reflects upon the final measurements of acceleration, the offset being added algebraically to the current value of the acceleration acting on the sensor. In the case where the offset value is comparable with the value of the pre-set acceleration threshold, there is the risk that the acceleration detected will not drop below the threshold, and that the free-fall event will hence not be identified. This situation is defined as a "missed event" and is particularly dangerous in so far as it does not enable the necessary protections on the portable apparatus to be carried out. Furthermore, there may be offset values such as to cause a detection of an anomalous event, for example a free fall event, even in the case where the portable apparatus is kept in a normal-mode condition. This situation is defined as "false trigger" and, even though it does not jeopardize integrity of the portable apparatus, may jeopardize operation thereof by, for example, repeatedly parking the read/write head of the hard disk during normal operation of the portable apparatus. In addition, the value of the offset can undergo variations over time, for example on account of ageing and/or structural modifications of the inertial sensor, thus rendering a possible compensation thereof problematical.

The second factor of disturbance is linked to the position of the inertial sensor on board the portable apparatus and to the displacement of the portable apparatus itself during the anomalous event (for example, during the free fall), and is caused by the centrifugal acceleration that may be generated upon rolling of the portable apparatus. In a known way, the centrifugal acceleration $A_c$ is given by the expression:

$$A_C = r \cdot (2 \cdot \pi \cdot \Phi)^2$$

where r is the distance of the inertial sensor from the center of mass of the portable apparatus, and $\Phi$ is the number of revolutions per second performed by the portable apparatus.

The contribution of the centrifugal acceleration $A_c$ is not in general negligible and can alter detection of the anomalous event. For example, considering a distance r of 5 cm and one revolution of the portable apparatus every two seconds, a centrifugal acceleration $A_c$ of approximately 0.80 g is developed. The contribution of the centrifugal acceleration can consequently be such that one or more of the components of acceleration acting on the portable apparatus does not drop below the pre-set threshold in the case of free fall, and the anomalous event is not detected. Likewise, the additional contribution due to the centrifugal acceleration can cause false detections of anomalous events.

In order to solve the above problems and to increase the reliability of detection of anomalous events, the use has been proposed of additional electronics in the detection devices such as to eliminate the contribution of the aforesaid factors of disturbance (by means of appropriate processing of the acceleration signals). This solution entails, however, an increase in the complexity and cost of the detection devices and of the corresponding portable apparatuses and, in the case where detection of anomalous events is entirely entrusted to a main microprocessor of the portable apparatus, an even considerable decrease in the corresponding performance.

Figure 1:
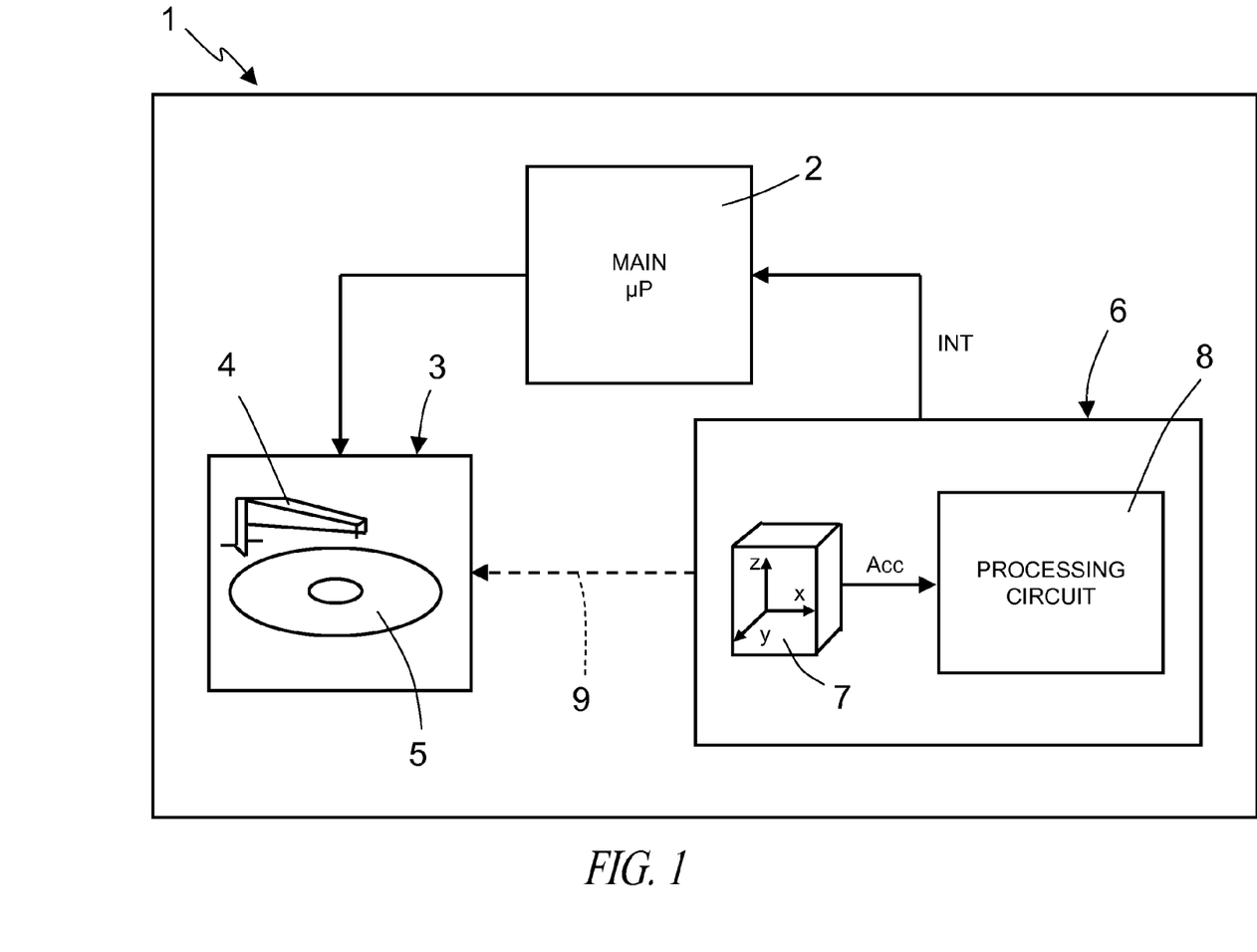
FIG. 1 shows a simplified block diagram of a portable apparatus provided with a device for detecting anomalous events, according to an embodiment.

As shown in FIG. 1, a portable apparatus 1, for example a portable computer (laptop), a PDA (Personal Data Assistant), a digital audio player, a mobile phone, a digital camcorder or photographic camera, a satellite navigator, or the like, includes a microprocessor control circuit 2, configured to control the general operation thereof, and a hard-disk device 3, operatively coupled to the microprocessor control circuit 2 for writing and reading data. In a per-se known manner, the hard-disk device 3 is provided with a read/write head 4 and a storage medium 5, associated with the read/write head 4.

The portable apparatus 1 further comprises a detection device 6 for detecting anomalous events associated with the portable apparatus, the detection device being provided for this purpose with: an accelerometer sensor 7, configured to detect one or more acceleration signals Acc corresponding to accelerations acting on the portable apparatus 1; and a processing circuit 8, connected to the accelerometer sensor 7 and configured to process the acceleration signals Acc in order to detect an anomalous event. For example, the detection device 6 can be configured to generate, when detecting an anomalous event, an interrupt signal INT, and to supply it, continuously and in real time, to the microprocessor control circuit 2 for enabling immediate activation of appropriate actions of protection (for example, parking of the read/write head 4 of the hard-disk device 3). Alternatively (and as is indicated schematically by the dashed arrow 9 of FIG. 1), the detection device 6 can be configured to directly carry out appropriate actions of protection, and to issue suitable control signals, e.g., for parking the read/write head 4.

The detection device 6 is integrated within the portable apparatus 1; for example, it can be provided in a chip and coupled to a printed circuit set within the portable apparatus 1, to which also the microprocessor control circuit 2 is coupled.

In greater detail, the accelerometer sensor 7 is a MEMS inertial sensor, made, for example, as described in "A Low-g 3 Axis Accelerometer for Emerging Automotive Applications", B. Grieco et al., AMAA 2004, which detects the components of the acceleration acting on the portable apparatus 1 directed along the three axes X, Y, Z of a set of three Cartesian axes fixed with respect to the portable apparatus 1, and supplies respective acceleration signals $Acc_x$, $Acc_y$, and $Acc_z$ (designated as a whole as acceleration signals Acc).

According to an aspect of the present invention, the detection device 6 is configured to monitor a normal-mode condition of the portable apparatus 1 and to detect an anomalous event as an exit from the normal-mode condition. In particular, as will be described in detail hereinafter, the detection device 6 considers the variations of an acceleration acting on the portable apparatus 1 (for example, variations between a current value and a previous value of acceleration) and detects a residence within the normal-mode condition when these variations are below a pre-set threshold. The threshold value depends, for example, on the type of portable apparatus, on the type of movements (and accelerations), and on the environmental conditions normally associated with its use. Preferably, the detection device 6 also evaluates the duration of residence of the portable apparatus 1 outside the normal-mode condition, and detects an anomalous event when this duration is longer than a pre-set time interval (the value of which is again a function of the type and conditions of use of the portable apparatus).

Figure 2:
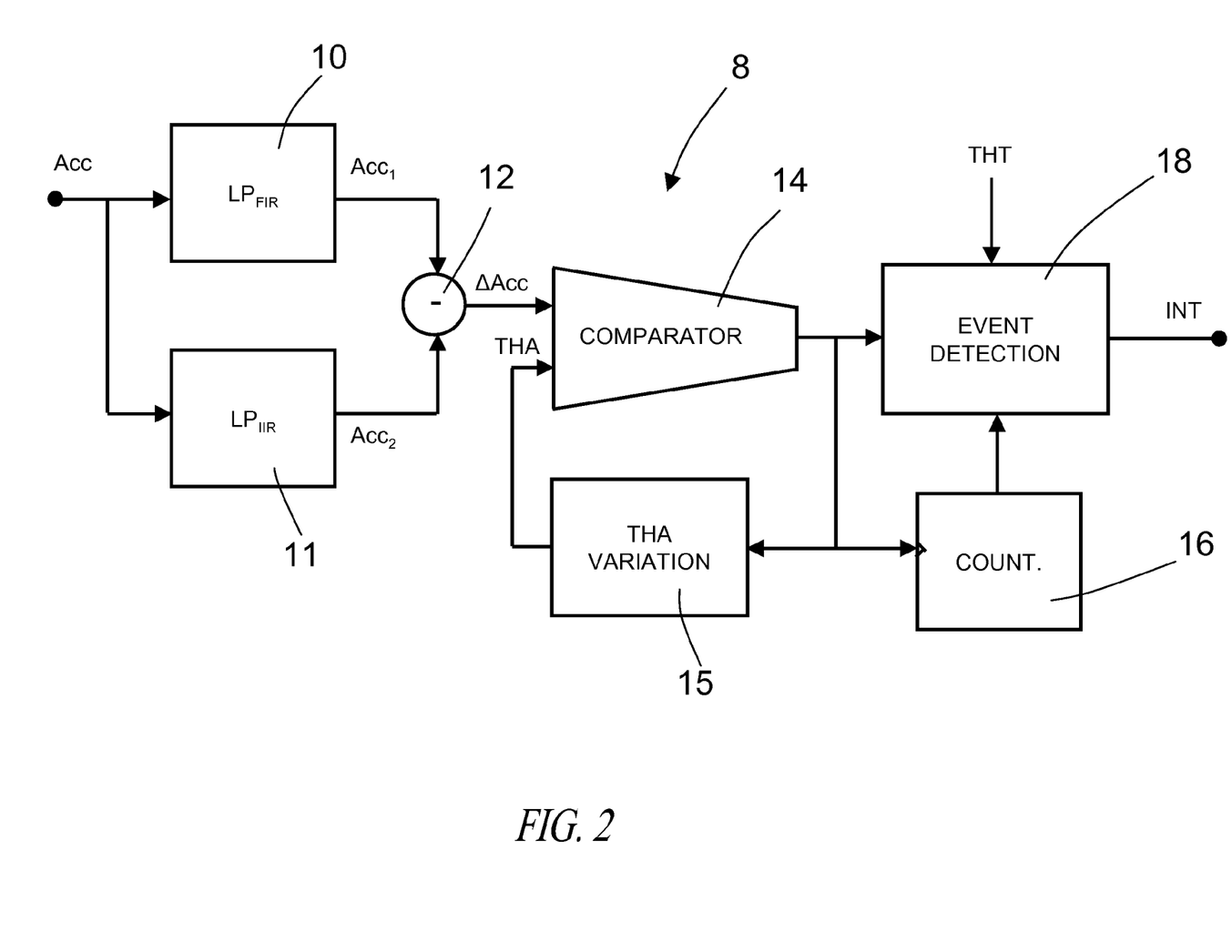
FIG. 2 shows a circuit block diagram of the device for detecting anomalous events of FIG. 1.

FIG. 2 shows an embodiment of the processing circuit 8 according to a first embodiment of the present invention.

In detail, the processing circuit 8 comprises: a first filtering stage 10, implementing a low-pass (LP) filter of a finite-impulse-response (FIR) type, which is connected to the accelerometer sensor 7 and supplies at output a first filtered acceleration signal $Acc_1$ (reference is made here, for simplicity, to the acceleration signal Acc as a whole and not to the corresponding acceleration components $Acc_x$, $Acc_y$ and $Acc_z$, but it is clear that similar considerations apply to the acceleration components); a second filtering stage 11, implementing a low-pass infinite-impulse-response (IIR) filter, which is connected to the accelerometer sensor 7, supplies at output a second filtered acceleration signal $Acc_2$, and has a cut-off frequency lower than that of the aforesaid FIR filter; and a combination stage 12, which has a first input and a second input, respectively connected to the output of the first filtering stage 10 and of the second filtering stage 11, and supplies at output a combination signal, which is a function of the first and second filtered acceleration signals. In particular, the combination stage 12 implements a subtractor stage and is configured to supply an acceleration-variation signal ΔAcc (shown in FIG. 4), given by the difference between the first filtered acceleration signal $Acc_1$ and the second filtered acceleration signal $Acc_2$.

The processing circuit 8 further comprises: a comparator stage 14, connected to the output of the combination stage 12 and configured to compare the value of the acceleration-variation signal ΔAcc (in particular a magnitude thereof, given by the combination of the contributions of the components along the three axes X, Y and Z) with an acceleration threshold THA, having a value that can vary, as will be described hereinafter, between a minimum value $THA_1$ and a maximum value $THA_2$, and to supply at output a comparison signal having a logic value; a threshold-variation stage 15, connected to the output of the comparator stage 14 and configured to vary the value of the acceleration threshold THA as a function of the value of the comparison signal; a counter stage 16, which is connected to the output of the comparator stage 14, receives the comparison signal at a count-enable input, and supplies at output a count signal; and a detection stage 18, which is connected to the output of the comparator stage 14 and of the counter stage 16 and is configured to supply at output the interrupt signal INT according to the value of the comparison signal and of the count signal.

The threshold-variation stage 15 is configured to vary dynamically the value of the acceleration threshold THA, gradually between the minimum value $THA_1$ and the maximum value $THA_2$, or vice versa (according to whether the comparison signal switches from a first value, e.g., a low value or logic "0", to a second value, e.g., a high value or logic "1", or vice versa).

The detection stage 18 is configured to set the interrupt signal INT to a given value (for example, a high logic value) upon detection of an anomalous event. In particular, the anomalous event is detected when the comparison signal has a given value, in particular a high value, and moreover the count signal is higher than a given time threshold THT (which can, for example, be set from outside by a user).

Figure 3:
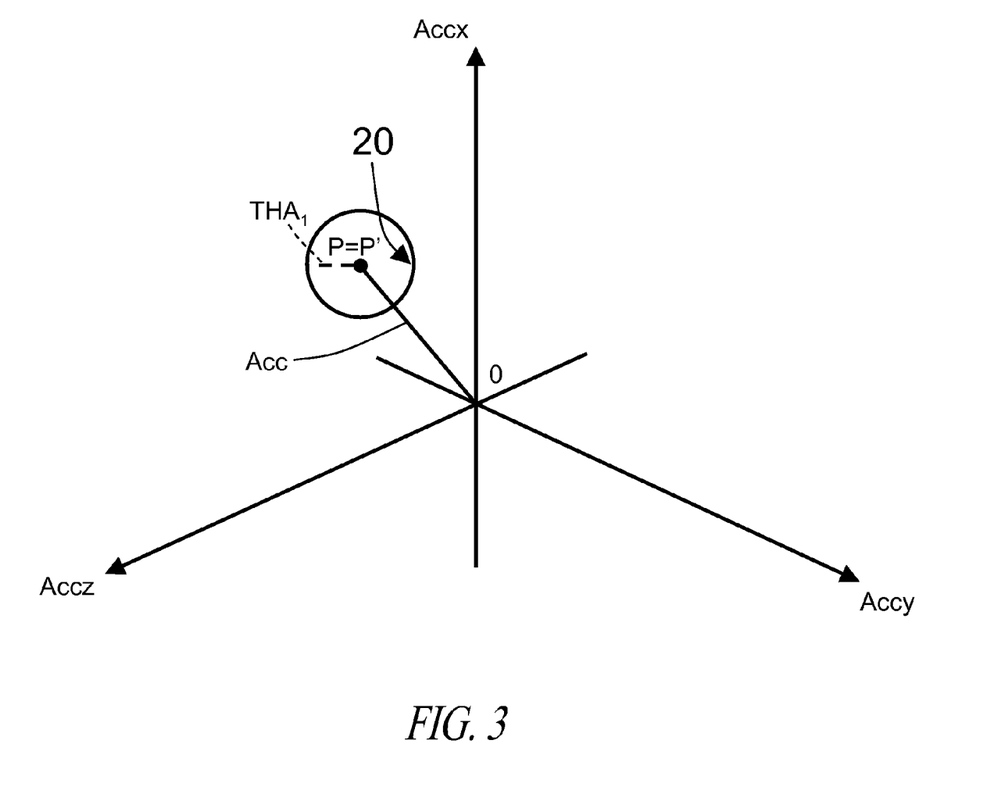
FIGS. 3-5 show representations, in the space of accelerations, of accelerations acting on the portable apparatus of FIG. 1 and of threshold regions associated therewith.
Figure 4:
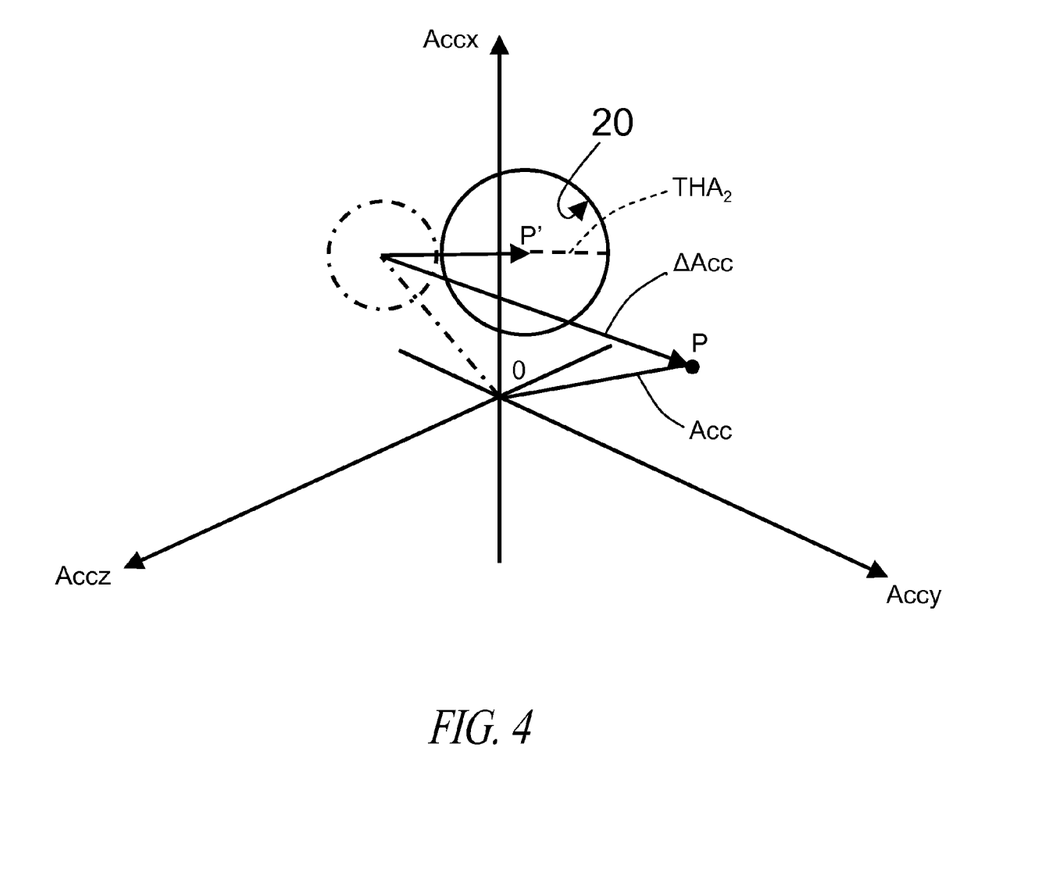
Figure 5:
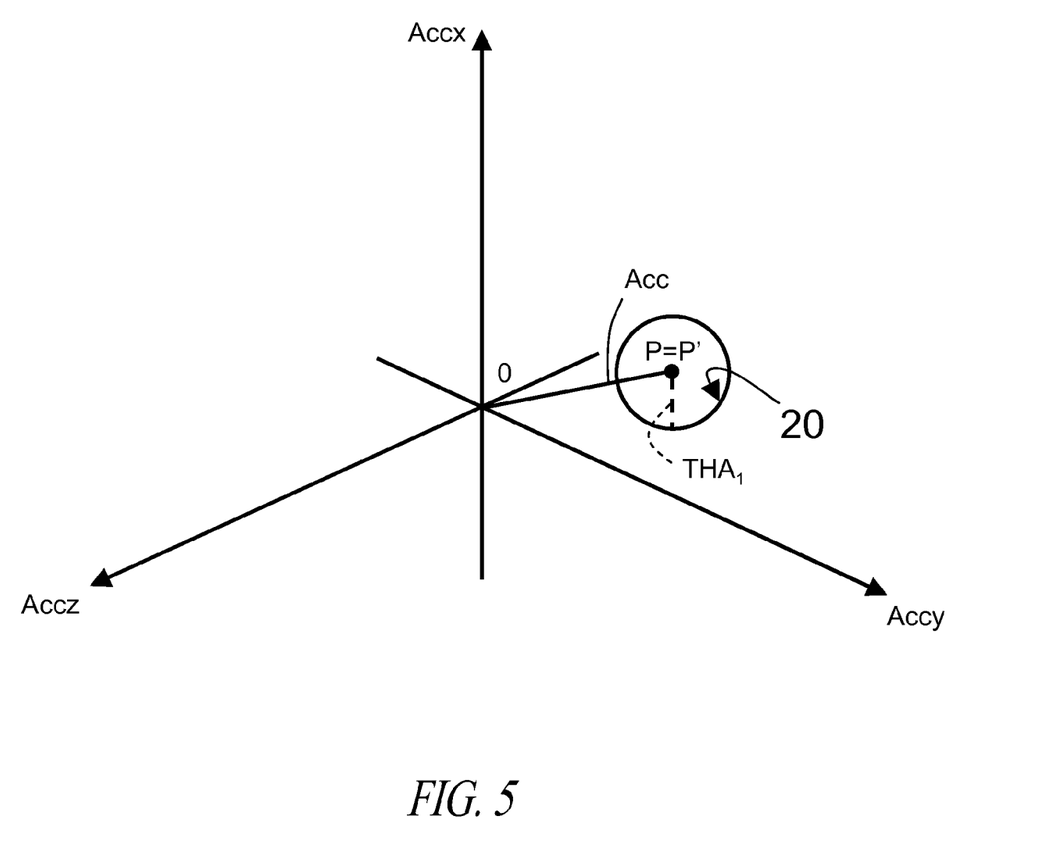

Operation of the processing circuit 8 for detecting an anomalous event is now described with reference to FIGS. 3-5, which show a three-dimensional space of accelerations in which the acceleration signals Acc and the acceleration-variation signal ΔAcc are represented.

In particular, the instantaneous value of the first filtered acceleration signal $Acc_1$ is represented by a first point P within the space of accelerations (with co-ordinates corresponding to its acceleration components $Acc_x$, $Acc_y$ and $Acc_z$), and its magnitude is represented by the distance of the first point P from the origin O of the axes. Variations of the resultant acceleration acting on the portable apparatus 1 correspond to displacements of the first point P within the space of accelerations. The instantaneous value of the second filtered acceleration signal $Acc_2$ is represented by a second point P', which also is the center of a spherical region having a radius equal to the minimum value $THA_1$ of the acceleration threshold THA. The spherical region represents a threshold region indicating a normal-mode condition of the portable apparatus 1 and is consequently referred to in what follows as normal-mode region 20. Variations of acceleration that keep the first point P within the normal-mode region 20 (and hence the acceleration-variation signal ΔAcc lower than the acceleration threshold THA) are indicative of a normal operation of the portable apparatus 1. In addition, in a condition of rest of the portable apparatus 1 (as shown in FIG. 3), the second point P' coincides with the first point P.

A variation of acceleration (FIG. 4) of anomalous extent (for example, due to a free-fall condition, to a violent shock, or to high vibrations) causes the point P to exit from the normal-mode region 20. The acceleration-variation signal ΔAcc exceeds the acceleration threshold THA, and the comparison signal at output from the comparator stage 14 goes to the high value. This event is interpreted by the processing circuit 8 of the detection device 6 as potentially indicating an anomalous event. However, for an anomalous event to be actually detected, residence outside the normal-mode condition has still to be verified for a pre-set period of time (the duration check) equal to the time threshold THT. The counter stage 16 is consequently enabled for counting by switching of the comparison signal.

Given that the second point P' is a result of the filtering operation carried out in the second filtering stage 11 by the IIR filter having a cut-off frequency lower than the FIR filter of the first filtering stage 10, the second point P' follows the displacements of the first point P with a certain delay. In general, the first point P represents a current value, whilst the second point P' represents a previous value of the acceleration acting on the portable apparatus 1. Thus, the normal-mode region 20, defined by the second point P', follows, with a delay, the displacement of the first point P. It should be noted that the rate of displacement of the normal-mode region 20 depends on the implementation of the IIR filter and its different cut-off frequency with respect to that of the FIR filter (in particular, and in a per-se known manner, it depends on a "weight" attributed to a current sample of the acceleration data as compared to that attributed to one or more previous samples).

Switching of the comparison signal causes the threshold-variation stage 15 to vary the acceleration threshold THA to the maximum value $THA_2$. The normal-mode region 20 is consequently enlarged, and its radius is increased until it becomes (either instantaneously or gradually) equal to the maximum value $THA_2$. In addition, switching of the comparison signal enables the counter stage 16 and starts the count signal. When the value of the count signal becomes higher than the time threshold THT, the detection stage 18 identifies an anomalous event and sets (for example to the high logic value) the interrupt signal INT.

The normal-mode region 20 then moves until its center (second point P') coincides again with the first point P (FIG. 5) (corresponding to a new condition of rest of the portable apparatus 1).

The processing circuit 8 detects re-entry of the first point P within the normal-mode region 20 upon switching of the comparison signal to the low value, and brings the interrupt signal INT back again to the low value. This event causes blocking of the count signal at output from the counter stage 16, thus defining the total duration of residence in an anomalous operating condition, and also the return of the normal-mode region 20 to the original dimensions, with a radius equal to the minimum value $THA_1$ of the acceleration threshold THA.

In particular, the enlargement of the normal-mode region 20 and the increase of the corresponding radius from the minimum value $THA_1$ to the maximum value $THA_2$ advantageously prevents repeated variations of acceleration having a value slightly higher than the minimum value $THA_1$ (i.e., located at the edge of the spherical region, in the space of accelerations) from being interpreted as anomalous events and giving rise to false-triggering events. In addition, as may be readily understood, variations of acceleration of a high value (and hence potentially dangerous) entail a greater duration of the time interval for re-entry of the first point P within the normal-mode region 20 and hence give rise to the identification of anomalous events.

Figure 6:
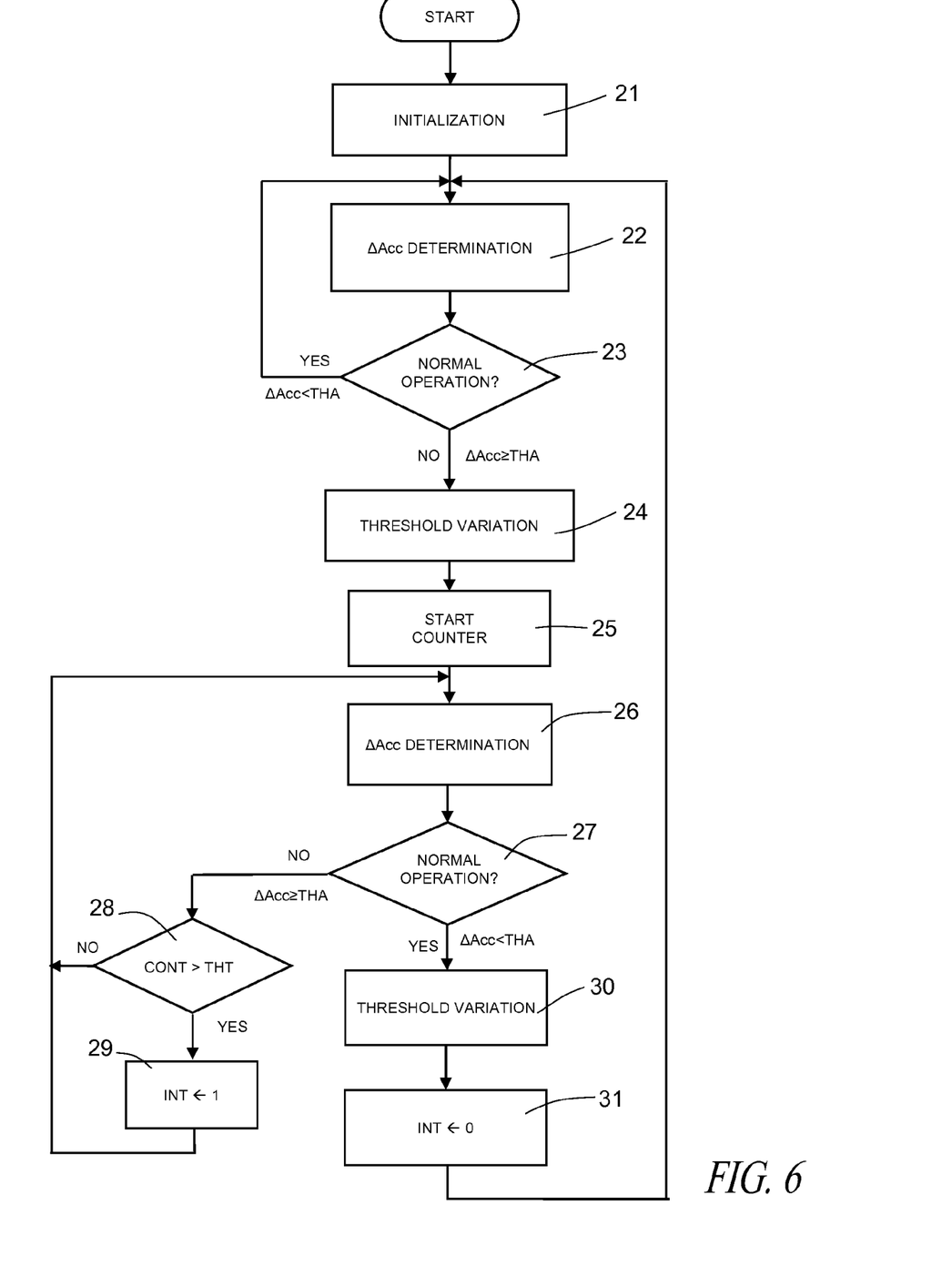
FIG. 6 is a flowchart corresponding to operations implemented by the device for detecting events of FIG. 2.

In brief, and with reference to the flowchart of FIG. 6, the algorithm described envisages at start an initialization step (block 21), in which, in particular, the normal-mode region 20 is centered on the first point P (so that upon turning-on no anomalous operating condition is detected).

Next, a continuous monitoring of the value of the acceleration-variation signal ΔAcc is implemented (block 22), which is indicative of the variation of acceleration between a current condition and a previous condition of the portable apparatus 1 so as to verify residence of the portable apparatus 1 in a normal-mode condition (block 23).

As soon as a variation of acceleration is detected higher than (or equal to) the acceleration threshold THA (initially set at the minimum value $THA_1$), which indicates exit from the normal-mode condition, the value of the acceleration threshold is varied gradually from the minimum value $THA_1$ to the maximum value $THA_2$ (block 24), and a count (CONT) of the duration of residence in the anomalous condition of operation (block 25) is started.

The procedure then waits for the return of the portable apparatus 1 into the normal-mode condition, while the acceleration-variation signal ΔAcc (block 26) is again monitored and compared with the acceleration threshold THA (block 27).

During residence in the anomalous operation condition, a check is made as to whether the count value (which is incremented as a function of an internal clock) exceeds the time threshold THT (block 28). If it does, an anomalous event is detected, and the interrupt signal INT is set to the high value (block 29). Then the procedure again waits for the return of the device into a normal-mode condition (blocks 26 and 27).

Upon entry into the normal-mode condition, the value of the acceleration threshold is gradually varied from the maximum value $THA_2$ to the minimum value $THA_1$ (block 30), and the interrupt signal INT returns to the low value (block 31). The algorithm then returns into a state of waiting for a new anomalous event (block 22).

The advantages that the device and the method for detecting anomalous events enable are clear from what has been described and illustrated above.

In particular, by monitoring exit of the portable apparatus 1 from a normal-mode condition, it is possible to detect a generic anomalous event, unlike traditional methods, which are focused on the identification of a particular type of anomalous event (for example, a free fall or a shock). The safety and possibility of protection of the portable apparatuses in the case of anomalous events is thus increased. In addition, the condition of normal use can advantageously be set and configured from outside, enabling adaptation to the particular type of portable apparatus in which the detection device is incorporated and to the environmental conditions associated with the use of the same portable apparatus. In the circuit embodiment described, it is possible, for example, to vary the minimum and maximum values of the acceleration threshold THA, the value of the time threshold THT, and the parameters and the cut-off frequency of the IIR filter in the second filtering stage 11. For example, in order to limit the number of false detections, the difference between the maximum value and the minimum value of the acceleration threshold THA will be generally greater when the portable apparatus is used in a noisy environment, or else, the speed of the IIR filter will be generally higher for a portable apparatus, e.g., a mobile phone, which is subject to displacements of a greater amount.

Figure 7:
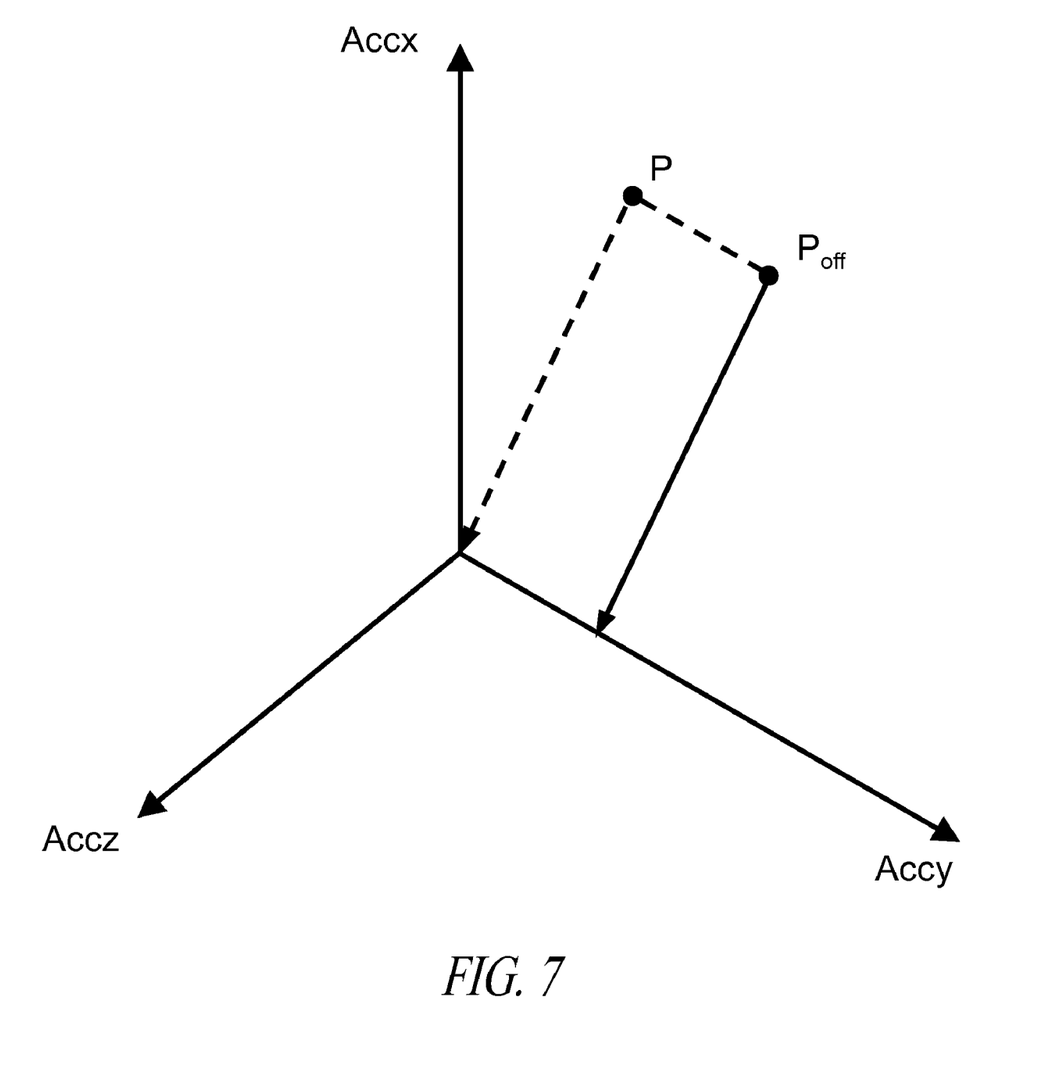
FIGS. 7 and 8 show further representations of accelerations acting on the portable apparatus 1.
Figure 8:
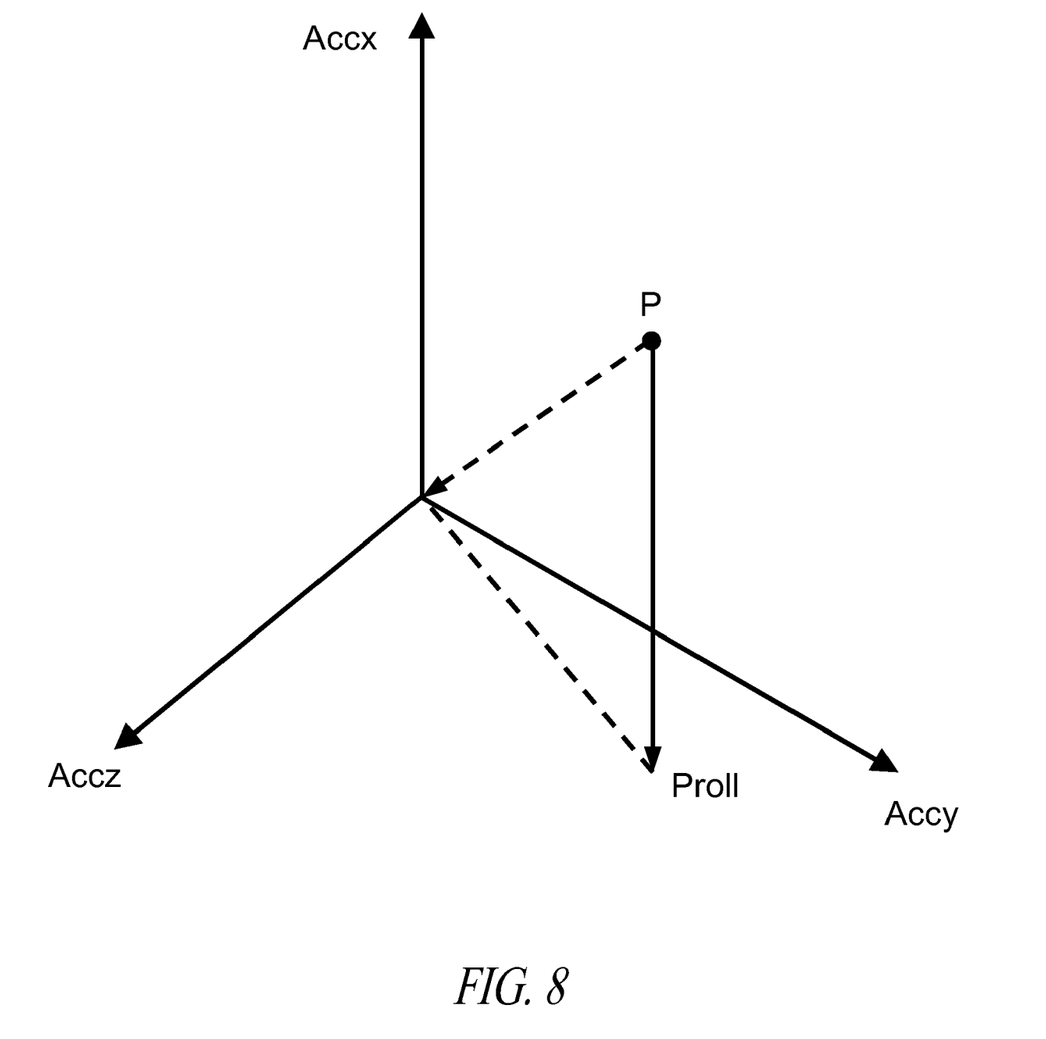

Checking the exit from the normal-mode condition enables monitoring (by successive comparisons with one or more thresholds) not of the particular value of the accelerations acting on the portable apparatus 1, but rather of the variations of the acceleration (or in other words the displacements in the space of accelerations). In this way, the problems associated with the presence of offsets in the accelerometer sensor 7 and with the development of centrifugal acceleration (roll effect) are avoided. In fact, as represented in FIGS. 7 and 8, which again refer to the space of accelerations, an offset or a centrifugal acceleration will not alter detection of an anomalous event (in the specific case, a free fall). In detail (FIG. 7), an offset of the accelerometer sensor 7 causes a variation of the acceleration detected in the resting condition (point $P_{off}$ displaced with respect to the ideal position, designated by P). The offset also causes a change in the position of arrival in the case of free fall, which does not coincide with the origin of the axes (the position in the absence of offsets is represented with a dashed line). The presence of offsets does not alter, however, the degree of the variation of acceleration that occurs upon the free fall. Consequently, the described algorithm, by comparing the variation of acceleration (or the displacement of the point P), and not the absolute value of acceleration, is not altered. Likewise (FIG. 8), the presence of a centrifugal acceleration varies the point of arrival of the point P after free fall, which does not reach the origin of the axes, but a different point, designated by $P_{ROLL}$. Advantageously, also in this case, the algorithm detects exit of the point P from the normal-mode region 20 (and hence the anomalous event), without being deceived by development of the centrifugal acceleration.

It is therefore possible to detect anomalous events associated with the portable apparatus 1 with a high degree of reliability, and hence greatly improve the protection of the portable apparatus. In addition, the circuit complexity and the consequent area occupation of the detection device 6 (in the case of hardware implementation), or the computing power required by the detection algorithm (in the case of software implementation) are extremely limited.

Finally, it is clear that modifications and variations may be made to what is described and illustrated herein, without thereby departing from the scope of the present invention, as defined in the annexed claims.

In particular, the algorithm implemented by the detection device 6 can envisage that, upon re-entry into the normal-mode condition, the interrupt signal INT goes back again to the low value not instantaneously, but with a certain delay, given by a further count (which can also be implemented by the counter stage 16). This variant is particularly advantageous for remaining in a state of alert and monitoring the anomalous event also in the case where the portable apparatus returns for a short period into a normal-mode condition and then exits again therefrom on account of a further anomalous event that is close in time. This situation can, in fact, indicate an imminent impact or other destructive event (that the algorithm described previously might not detect with a sufficient readiness).

Figure 9:
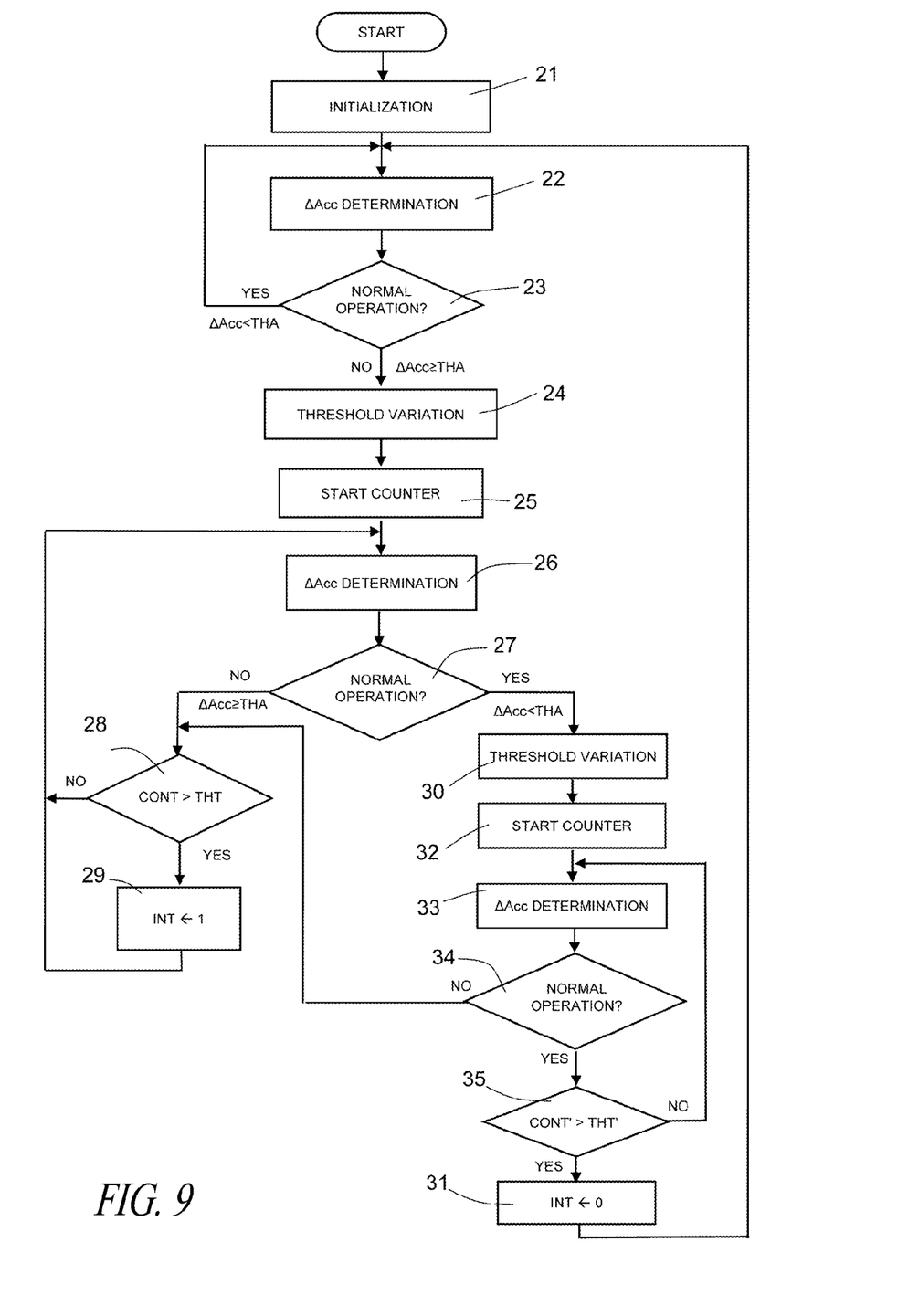
FIG. 9 is a flowchart corresponding to operations implemented by the device for detecting events of FIG. 2, according to a different embodiment of the present invention.

FIG. 9 shows a flowchart regarding this variant, which basically coincides with the one described in FIG. 6, except as regards a reset procedure of the interrupt signal INT. In detail, upon return of the portable apparatus 1 into the normal-mode condition (output YES from block 27), in addition to the variation of the acceleration threshold value from the maximum value $THA_2$ to the minimum value $THA_1$ (block 30), a further count (CONT') is started for detecting the duration of residence in the normal-mode condition (block 32). Then the value of the acceleration-variation signal $\Delta Acc$ is monitored again (block 33) so as to verify residence of the portable apparatus 1 in a normal-mode condition (block 34). During the residence in this condition, a check is made as to whether the value of the further count exceeds a further time threshold THT' (block 35). If it does, the interrupt signal INT is brought back again to the low value (block 31, described previously), and the algorithm returns into a state of wait for a new anomalous event (block 22). Instead, if a new exit from the normal-mode condition is determined (output NO from block 34), the algorithm returns to block 28 so as to continue monitoring of the anomalous event (basically, the momentary return of the portable apparatus 1 into a normal-mode condition is ignored by the algorithm).

In addition, the processing circuit 8 may be modified so as to determine not only the occurrence of an anomalous event, but also the type of the anomalous event, by means of additional processing operations on the acceleration signals Acc. For example, in order to identify a free-fall event, the processing circuit 8 can be configured to determine a decrease of the magnitude of the acceleration signal Acc in the current condition, as compared to the previous condition, higher than a given threshold (in the case of free fall, in fact, the components of the acceleration signal Acc ideally go to zero).

The variation of the acceleration signal can be determined in a way different from what has been illustrated and described. In addition, filtering of the acceleration signal Acc in the first filtering stage 10 can be omitted.

The further control on the duration of residence of the portable apparatus 1 in an anomalous condition of operation can be omitted in given applications and with a given choice of the minimum and maximum values of the acceleration threshold THA.

In addition, the processing circuit 8 can be modified so as to implement different acceleration thresholds along the axes X, Y, Z, and the normal-mode region 20 can consequently have a shape different from the spherical shape described and illustrated.

As used in the specification and claims, the term residence refers to an acceleration condition of a subject device. For example: a level of acceleration of a device within a defined acceptable range of acceleration may be referred to as residence of the device within a normal-mode condition; and elapsed time during which acceleration of the device is outside a defined normal-mode condition may be referred to as duration of residence outside the normal-mode condition or duration of residence in an anomalous operation condition.

The abstract of the present disclosure is provided as a brief outline of some of the principles of the disclosure, and is not intended as a complete or definitive description of any embodiment thereof, nor should it be relied upon to define terms used in the specification or claims. The abstract does not limit the scope of the claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
generating an acceleration signal indicative of an acceleration acting on an electronic apparatus;
detecting an anomalous event of the apparatus as a function of said acceleration signal, including:
monitoring a normal-mode condition of said electronic apparatus;
detecting exits of said electronic apparatus from said normal-mode condition,
determining durations of residence of said electronic apparatus outside said normal-mode condition,
detecting said anomalous event as a function of a sum of two successive ones of said durations of residence outside of said normal-mode condition, provided an intervening duration of residence of said electronic apparatus within said normal-mode condition is less than a selected threshold; and
acting to protect the electronic apparatus upon detection of the anomalous event.

2. The method according to claim 1 wherein said step of monitoring a normal-mode condition comprises:
determining a variation of acceleration associated with said acceleration signal;
executing a comparison between said variation of acceleration and an acceleration threshold; and
determining residence in, or exit from, said normal-mode condition according to the result of said comparison.

3. The method according to claim 2 wherein said step of monitoring a normal-mode condition further comprises setting the value of said acceleration threshold as a function of given characteristics of said electronic apparatus.

4. The method according to claim 2 wherein said step of determining said variation of acceleration comprises determining a variation between a current value and a previous value of said acceleration signal.

5. The method according to claim 2 wherein said step of determining said variation of acceleration comprises:
filtering said acceleration signal with a filter having a given cut-off frequency so as to obtain a filtered acceleration signal; and
determining said variation of acceleration as a difference between a signal correlated to said acceleration signal and said filtered acceleration signal.

6. The method according to claim 5 wherein said step of determining said variation of acceleration further comprises filtering said acceleration signal with a further filter having a cut-off frequency higher than said given cut-off frequency so as to obtain said signal correlated to said acceleration signal.

7. The method according to claim 2 wherein said step of detecting said anomalous event further comprises: varying dynamically the value of said acceleration threshold according to the result of said comparison.

8. The method according to claim 7 wherein said step of varying dynamically the value of said acceleration threshold comprises increasing the value of said acceleration threshold from a lower value to a higher value upon exit from said normal-mode condition, and decreasing the value of said acceleration threshold from said higher value to said lower value, upon entry into said normal-mode condition.

9. The method of claim 1 wherein the step of determining a first duration of residence comprises determining that the first duration of residence is greater than a selected duration threshold.

10. A device for detecting an anomalous event in an electronic apparatus, comprising:
an accelerometer sensor, configured to produce at least one acceleration signal indicative of an acceleration acting on said electronic apparatus; and
a processing circuit, including:
a monitoring stage, configured to monitor a normal-mode condition of said electronic apparatus; and
a detection stage, coupled to said monitoring stage, and configured to detect an exit of said electronic apparatus from said normal-mode condition, to determine a duration of residence of said apparatus outside said normal-mode condition, and to detect said anomalous event as a function of said exit from and duration of residence of said electronic apparatus outside said normal-mode condition and configured to detect said anomalous event as a function of a sum of durations of two periods of residence outside said normal-mode condition provided an intervening return to said normal-mode condition is for a period of less than a selected duration.

11. The device according to claim 10 wherein said monitoring stage comprises determination means for determining a variation of acceleration associated with said acceleration signal, and comparison means for comparing said variation of acceleration with an acceleration threshold; and wherein said detection stage is configured to determine residence in, or exit from, said normal-mode condition according to the result of said comparison.

12. The device according to claim 11 wherein said monitoring stage further comprises setting means, operable to set the value of said acceleration threshold according to given characteristics of said electronic apparatus.

13. The device according to claim 11 wherein said determination means are configured so as to determine a variation between a substantially current value and a previous value of said acceleration signal.

14. The device according to claim 11 wherein said determination means comprise: filtering means configured to filter said acceleration signal with a given cut-off frequency so as to generate a filtered acceleration signal; and subtractor means, configured to determine said variation of acceleration as a difference between a signal correlated to said acceleration signal and said filtered acceleration signal.

15. The device according to claim 14 wherein said determination means further comprise further filtering means configured to generate said signal correlated to said acceleration signal; said filtering means having a cut-off frequency lower than said further filtering means.

16. The device according to claim 15 wherein said filtering means include an IIR filter and said further filtering means include a FIR filter.

17. The device according to claim 11 wherein said detection stage further comprises a counter stage, configured to determine the duration of residence of said apparatus outside said normal-mode condition.

18. The device according to claim 11 wherein said detection stage further comprises a threshold-variation stage, configured to vary dynamically the value of said acceleration threshold according to the result of said comparison.

19. The device according to claim 18 wherein said threshold-variation stage is configured to increase the value of said acceleration threshold from a lower value toward a higher value upon exit from said normal-mode condition, and decrease the value of said acceleration threshold toward said lower value upon entry into said normal-mode condition.

20. The device according to claim 11 for an electronic apparatus, further comprising protection means configured to perform operations of protection of said device upon detection of said anomalous event.

21. The device of claim 10 wherein the detection stage is configured to determine that the duration of residence of the apparatus outside the normal-mode condition is at least a period equal to a selected duration threshold.

22. An electronic apparatus, comprising:
a microprocessor control circuit;
a detection device including:
an accelerometer sensor, configured to produce at least one acceleration signal indicative of an acceleration acting on said electronic apparatus; and
a processing circuit, separate from the microprocessor control circuit, configured to detect an anomalous event as a function of said acceleration signal, the processing circuit configured to monitor a normal-mode condition of said electronic apparatus and to detect said anomalous event based on duration of residence of said electronic apparatus outside said normal-mode condition, and also to detect said anomalous event based on a sum of the duration of residence outside said normal-mode condition and of a second duration of residence outside said normal-mode condition if an intervening period of residence within said normal-mode condition is less than a threshold duration, the processing circuit further configured to increase, toward a maximum value, a threshold defining the normal mode condition if the electronic apparatus exits the normal mode region.

23. The apparatus according to claim 22, further comprising a hard-disk device and a control circuit connected to said hard-disk device; said detection device being configured to supply to said control circuit a detection signal upon detection of said anomalous event, and said control circuit being configured to activate a protective action of said hard-disk device upon reception of said detection signal.

24. A method, comprising:
detecting acceleration of an electronic apparatus;
establishing a range of accelerations that defines a normal-mode region of the electronic apparatus based on a first detected level of acceleration; detecting an acceleration that falls outside the normal-mode region;
determining a first duration of residence of the electronic apparatus outside, the normal-mode region;
signaling detection of an anomalous event if the first duration of residence exceeds a first duration threshold;
determining a duration of residence of the electronic apparatus within the normal-mode region following the first residence of the electronic apparatus outside the normal-mode region;
if the duration of residence of the electronic apparatus within the normal-mode region is less than a second duration threshold, then determining a second duration of residence of the electronic apparatus outside the normal-mode region that follows the residence of the electronic apparatus within the normal-mode region; and
signaling detection of an anomalous event if a sum of the first duration of residence and the second duration of residence exceeds the first duration threshold.

25. The method of claim 24, comprising:
increasing, while the electronic apparatus resides outside the normal-mode region, the range of accelerations that defines the normal-mode region of the electronic apparatus toward a maximum range; and
decreasing, while the electronic apparatus resides within the normal-mode region, the range of accelerations that defines the normal-mode region of the electronic apparatus toward a minimum range.

26. The method of claim 24, comprising:
displacing, while the electronic apparatus resides outside the normal-mode region, the range of accelerations that defines the normal-mode region toward a current value of acceleration of the electronic apparatus.

* * * * *

UNITED STATES PATENT AND TRADEMARK OFFICE
CERTIFICATE OF CORRECTION

| | | |
|---|---|---|
| PATENT NO. | : 7,979,235 B2 | Page 1 of 1 |
| APPLICATION NO. | : 12/357620 | |
| DATED | : July 12, 2011 | |
| INVENTOR(S) | : Fabio Pasolini et al. | |

It is certified that error appears in the above-identified patent and that said Letters Patent is hereby corrected as shown below:

Column 13, Lines 3-6:
"establishing a range of accelerations that defines a normal-mode region of the electronic apparatus based on a first detected level of acceleration; detecting an acceleration that falls outside the normal-mode region;" should read,
--establishing a range of accelerations that defines a normal-mode region of the electronic apparatus based on a first detected level of acceleration;
detecting an acceleration that falls outside the normal-mode region;--.

Column 13, Line 8:
"apparatus outside, the normal-mode region;" should read, --apparatus outside the normal-mode region;--.

Signed and Sealed this
Sixth Day of November, 2012

David J. Kappos
*Director of the United States Patent and Trademark Office*